United States Patent
Robertson et al.

(10) Patent No.: US 9,318,780 B2
(45) Date of Patent: Apr. 19, 2016

(54) WIRELESSLY RECHARGEABLE BATTERY AND POWER TRANSMITTER

(75) Inventors: Daniel Robertson, Auckland (NZ); Kunal Bhargava, Auckland (NZ); Thushari Gomes, West Drayton (GB)

(73) Assignee: PowerbyProxi Limited, Freemans Bay, Auckland (NZ)

( * ) Notice: Subject to any disclaimer, the term of this patent is extended or adjusted under 35 U.S.C. 154(b) by 75 days.

(21) Appl. No.: 13/885,805

(22) PCT Filed: Nov. 16, 2011

(86) PCT No.: PCT/NZ2011/000241
§ 371 (c)(1),
(2), (4) Date: Jun. 24, 2013

(87) PCT Pub. No.: WO2012/067522
PCT Pub. Date: May 24, 2012

(65) Prior Publication Data
US 2014/0232330 A1    Aug. 21, 2014

(30) Foreign Application Priority Data
Nov. 16, 2010  (NZ) ................................ 589312

(51) Int. Cl.
| H02J 7/00 | (2006.01) |
| H01M 10/46 | (2006.01) |
| H01M 2/10 | (2006.01) |
| H01M 10/42 | (2006.01) |
| H02J 5/00 | (2006.01) |
| H02J 7/02 | (2006.01) |
| H01F 38/14 | (2006.01) |

(52) U.S. Cl.
CPC ............... *H01M 10/46* (2013.01); *H01F 38/14* (2013.01); *H01M 2/1022* (2013.01); *H01M 10/425* (2013.01); *H02J 5/005* (2013.01); *H02J 7/025* (2013.01)

(58) Field of Classification Search
CPC ........ H02J 7/025; H01F 38/14; Y02T 90/122; B60L 11/182; Y02E 60/12
USPC ......................................................... 320/108
See application file for complete search history.

(56) References Cited

U.S. PATENT DOCUMENTS

| 3,938,018 | A | * | 2/1976 | Dahl ............................ 320/140 |
| 4,654,573 | A | | 3/1987 | Rough et al. |
| 5,045,770 | A | | 9/1991 | Brooks |
| 5,293,308 | A | | 3/1994 | Boys et al. |
| 5,311,198 | A | | 5/1994 | Sutton |
| 5,450,305 | A | | 9/1995 | Boys et al. |
| 5,596,567 | A | | 1/1997 | deMuro et al. |
| 6,028,413 | A | | 2/2000 | Brockmann |
| 6,150,794 | A | * | 11/2000 | Yamada et al. ............. 320/108 |
| 6,330,175 | B2 | | 12/2001 | Shirato et al. |
| 6,445,936 | B1 | | 9/2002 | Cannon et al. |
| 6,803,744 | B1 | * | 10/2004 | Sabo .............................. 320/108 |
| 6,873,242 | B2 | * | 3/2005 | Ahrens et al. ................. 336/200 |
| 7,042,196 | B2 | | 5/2006 | Ka-Lai et al. |
| 7,248,017 | B2 | | 7/2007 | Cheng et al. |
| 7,382,636 | B2 | | 6/2008 | Baarman et al. |
| 2002/0057584 | A1 | | 5/2002 | Brockmann |
| 2003/0193819 | A1 | | 10/2003 | Iwagami et al. |
| 2005/0135122 | A1 | | 6/2005 | Cheng et al. |
| 2007/0109708 | A1 | | 5/2007 | Hussman et al. |
| 2008/0179983 | A1 | | 7/2008 | Hasegawa et al. |
| 2008/0203955 | A1 | | 8/2008 | Gomi et al. |
| 2008/0238364 | A1 | * | 10/2008 | Weber et al. .................. 320/108 |
| 2008/0298100 | A1 | * | 12/2008 | Esaka et al. ..................... 363/67 |
| 2009/0001932 | A1 | | 1/2009 | Kamijo et al. |
| 2009/0015210 | A1 | | 1/2009 | Kojima |
| 2009/0058361 | A1 | | 3/2009 | John |
| 2009/0284369 | A1 | | 11/2009 | Toncich et al. |
| 2010/0084918 | A1 | | 4/2010 | Fells et al. |
| 2010/0123430 | A1 | * | 5/2010 | Kojima et al. ................. 320/108 |
| 2010/0171367 | A1 | | 7/2010 | Kitamura et al. |
| 2010/0181962 | A1 | | 7/2010 | Chen et al. |
| 2010/0187913 | A1 | | 7/2010 | Smith et al. |
| 2010/0259215 | A1 | | 10/2010 | Sip |
| 2011/0090723 | A1 | | 4/2011 | Hu et al. |
| 2014/0306545 | A1 | | 10/2014 | Robertson et al. |

FOREIGN PATENT DOCUMENTS

| CN | 1585991 | 2/2005 |
| CN | 101795022 | 8/2010 |
| CN | 201749754 | 2/2011 |
| JP | 2000-242756 | 9/2000 |
| JP | 2001-5938 | 1/2001 |
| JP | 2002-010535 | 1/2002 |
| JP | 2005-525705 | 8/2005 |
| NZ | 274939 | 6/1997 |

(Continued)

OTHER PUBLICATIONS

Non-Final Rejection mailed in co-pending U.S. Appl. No. 12/991,054 mailed Nov. 21, 2012 (11 pages).

Response to Non-Final Rejection (mailed Nov. 21, 2012) for U.S. Appl. No. 12/991,054, filed Feb. 21, 2013 (10 pages).

Final Rejection mailed in co-pending U.S. Appl. No. 12/991,054 mailed May 22, 2014 (10 pages).

Response to Final Rejection (mailed May 22, 2014) for U.S. Appl. No. 12/991,054, filed Aug. 22, 2014 (9 pages).

Advisory Action mailed in co-pending U.S. Appl. No. 12/991,054 mailed Nov. 10, 2014 (3 pages).

Reponse to Advisory Action (mailed Nov. 10, 2014) for U.S. Appl. No. 12/991,054, filed Nov. 12, 2014 (9 pages).

(Continued)

*Primary Examiner* — Arun Williams
(74) *Attorney, Agent, or Firm* — Merchant & Gould P.C.

(57) ABSTRACT

A wirelessly rechargeable battery is provided having coils oriented off major battery axes to facilitate good coupling with power transmitter magnetic fields. A magnetic core may house charging electronics for a compact form factor. A wireless power transmitter that produces fields to maximize coupling with receiver coils.

13 Claims, 6 Drawing Sheets

(56) References Cited

FOREIGN PATENT DOCUMENTS

| | | |
|---|---|---|
| NZ | 526115 | 10/2006 |
| WO | WO 03/096512 | 11/2003 |
| WO | WO 2004/105208 | 12/2004 |
| WO | WO 2006/049606 | 5/2006 |
| WO | WO 2010/005324 | 1/2010 |
| WO | WO 2010/111152 | 9/2010 |
| WO | WO 2011/135424 | 11/2011 |

OTHER PUBLICATIONS

Non-Final Rejection mailed in co-pending U.S. Appl. No. 12/991,054 mailed Jan. 24, 2015 (9 pages).
New Zealand Examination report for NZ 629233 mailed Aug. 14, 2014 (2 pages).
Chinese Office Action for CN Application No. 201180055313.1 mailed Sep. 11, 2015 (English Translation included), 4 pages.

* cited by examiner

WIRELESSLY RECHARGEABLE BATTERY AND POWER TRANSMITTER

This application is a National Stage Application of PCT/NZ2011/000241, filed 16 Nov. 2011, which claims benefit of Serial No. 589312, filed 16 Nov. 2010 in New Zealand and which applications are incorporated herein by reference. To the extent appropriate, a claim of priority is made to each of the above disclosed applications.

FIELD OF THE INVENTION

This invention relates to a wirelessly rechargeable battery and a power transmitter. More particularly, but not exclusively, this invention relates to wirelessly rechargeable batteries where the coils are offset to facilitate charging in any direction and a power transmitter generating arcing flux distributions between adjacent coils energised with alternating polarities.

BACKGROUND OF THE INVENTION

Rechargeable batteries are increasingly replacing single use batteries due to economic, performance convenience and environmental factors. Rechargeable batteries have been integrated into electric devices, such as cordless toothbrushes, for some time. Such devices typically locate the device with respect to a charger to ensure good coupling for efficient power transfer.

There is a demand for wirelessly rechargeable batteries to be provided in a standard battery casing. There is limited space within the casing for the electrochemical cell, charging circuit and coils. Further it would be desirable to be able to charge a battery in any orientation within a general charging region and when located within an electronic device.

Batteries are typically housed in an orientation parallel or orthogonal to the faces of an electronic device. Power transmitters in the form of charging mats etc. typically generate a field normal to the charging surface. Thus in some orientations there may be limited coupling between the coils within a wirelessly rechargeable battery and the coils of the power transmitter. Power transmitters may also be wasteful in generating a full charging field whether batteries are present or not.

It is an object of the invention to provide a battery and/or power transmitter enabling charging in all typical orientations in an energy efficient manner or to at least provide the public with a useful choice.

SUMMARY OF THE INVENTION

According to one exemplary embodiment there is provided a wirelessly rechargeable battery comprising:
   a. an elongate battery casing having a longitudinal axis;
   b. a rechargeable storage device;
   c. a plurality of power receiving coils disposed at an angle of between 30 to 60 degrees to the longitudinal axis; and
   d. a charging circuit for controlling the supply of power from the coils to the storage device.

According to another exemplary embodiment there is provided a wirelessly rechargeable battery comprising:
   a. a battery casing;
   b. a rechargeable storage device;
   c. one or more power receiving coils mounted on a ferrite core; and
   d. a charging circuit for controlling the supply of power from the coils to the storage device at least partially housed within the ferrite core.

According to another exemplary embodiment there is provided a wireless power transmitter including:
   a. a plurality of power transmission coils arranged in a planar array; and
   b. a driving circuit for driving the coils such that at least a first coil is driven so as to produce an alternating magnetic field of opposite polarity to that produced by a second coil.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e. they will be taken to mean an inclusion of the listed components which the use directly references, and possibly also of other non-specified components or elements.

Reference to any prior art in this specification does not constitute an admission that such prior art forms part of the common general knowledge.

BRIEF DESCRIPTION OF THE DRAWINGS

The accompanying drawings which are incorporated in and constitute part of the specification, illustrate exemplary embodiments of the invention and, together with the general description of the invention given above, and the detailed description of embodiments given below, serve to explain the principles of the invention.

DETAILED DESCRIPTION OF EMBODIMENTS OF THE INVENTION

Figure 1:
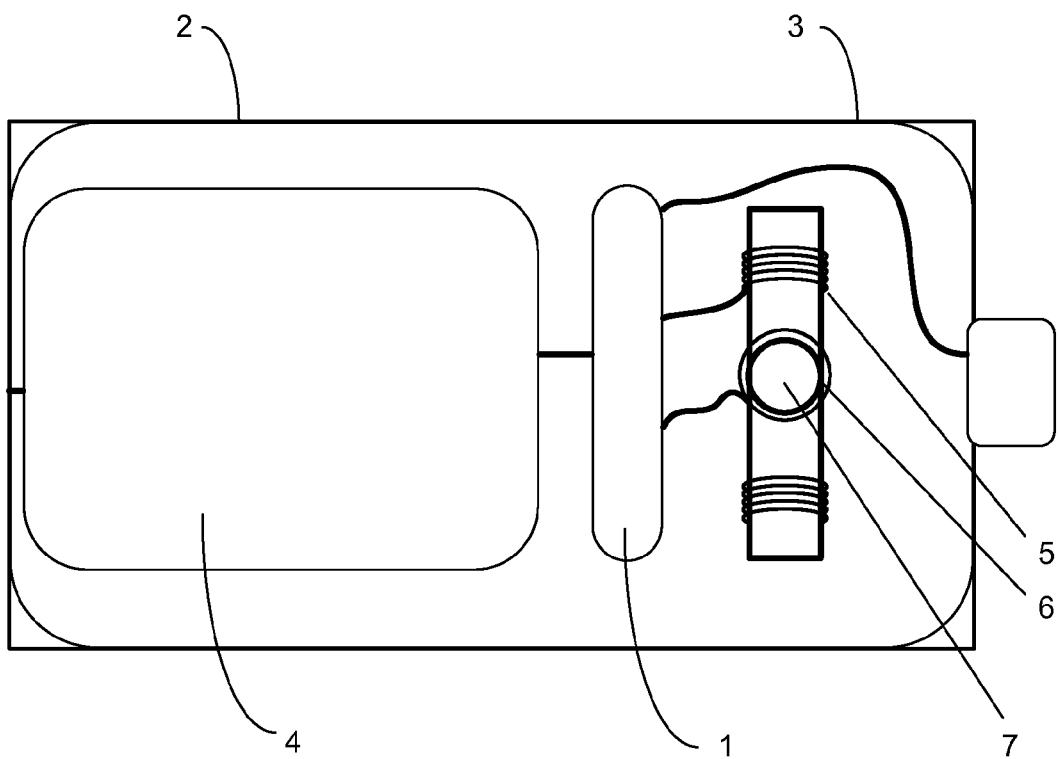
FIG. 1 shows a wirelessly rechargeable battery having a charging circuit housed within a magnetic core.
Figure 7:
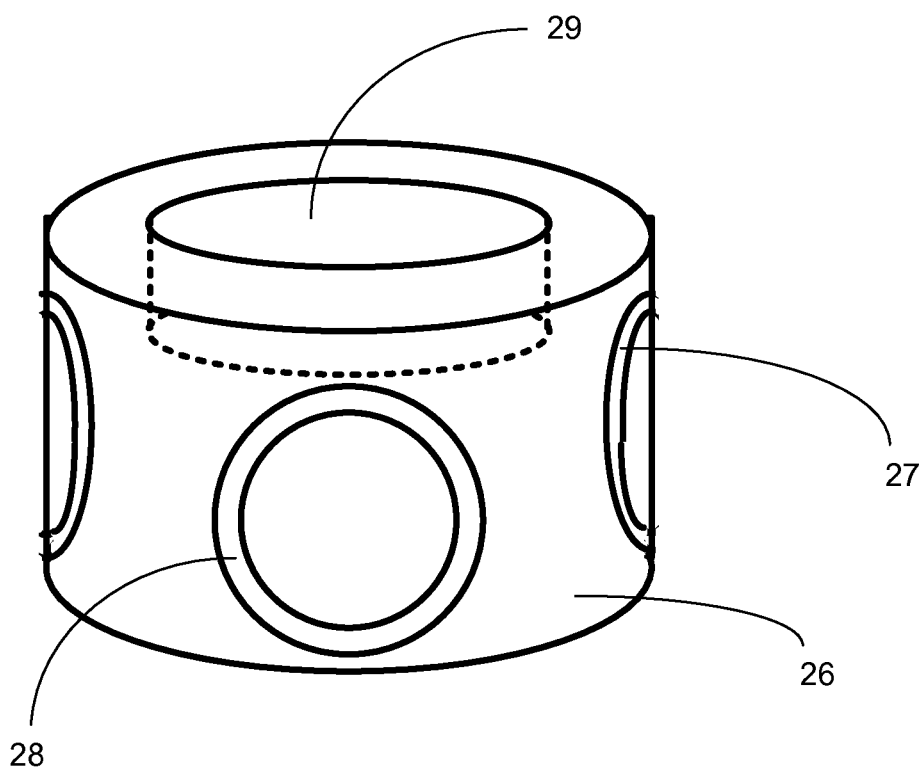
FIG. 7 Shows how a cylindrical magnetic core may be shaped.

FIG. 1 shows a first embodiment of wirelessly rechargeable battery having a cylindrical casing consisting of lower section 2, that may be metallic, and an upper section 3, that is non-metallic. The casing contains a storage device 4 that is typically a rechargeable electrochemical cell but could be a capacitor or other energy storage device. Orthogonal coils 5 and 6 are wound on magnetic core 7 (typically ferrite) and oriented transverse to the longitudinal axis of the battery. Charging circuit 1 may be located within the magnetic core to minimise the form factor of the charging circuit (as shown in FIG. 7). This topology is compact but may result in week coupling if the coils 5 and 6 are normal to the charging field.

Figure 2:
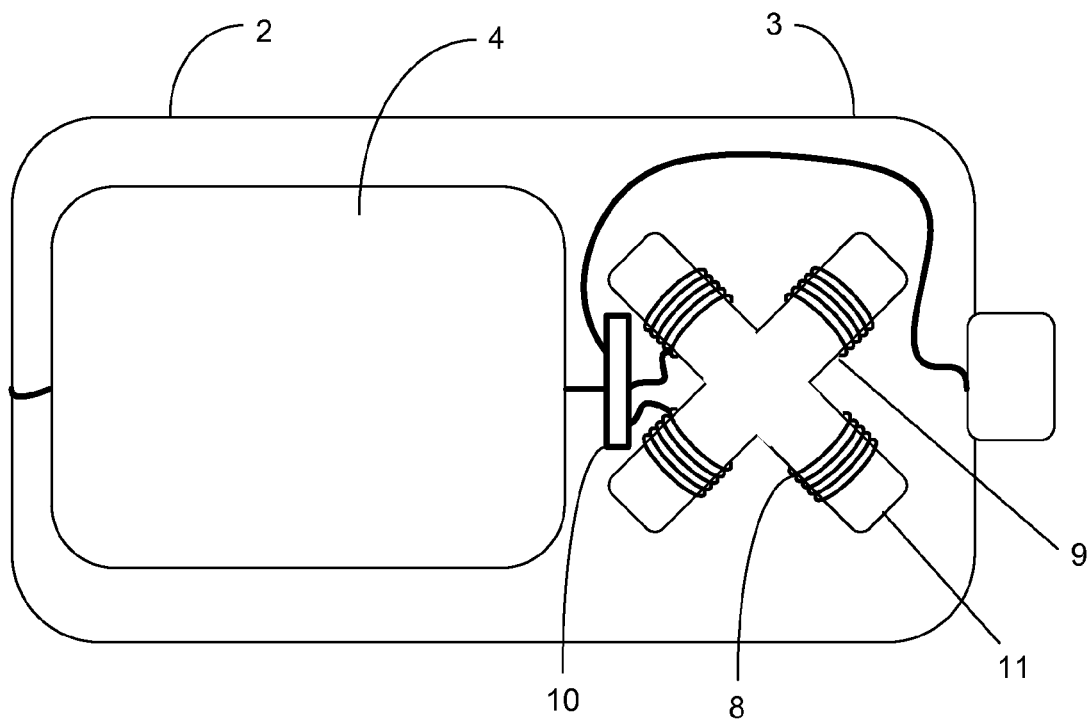
FIG. 2 shows a wirelessly rechargeable battery having power receiving coils disposed at 45 degrees to the longitudinal axis of the battery.

FIG. 2 shows an alternate topology in which coils 8 and 9 are oriented at 45 degrees to the longitudinal axis of the battery. This ensures that for any standard orientation with respect to a power transmitter (i.e. up, down or flat in any orientation) that there will be sufficient coupling between power transmitter coils and battery coils. The offset angle may be within a range of about 30 to 60 degrees. This allows the preferred battery orientation to have the most favoured coupling whilst providing adequate coupling for less preferred orientations. Charging circuit 10 may be housed within the magnetic core 11. It will be appreciated that the magnetic core 11 may simply be a cylindrical block of ferrite with grooves on the exterior for the coils and an internal cavity for the charging circuit (as shown in FIG. 7).

Figure 3:
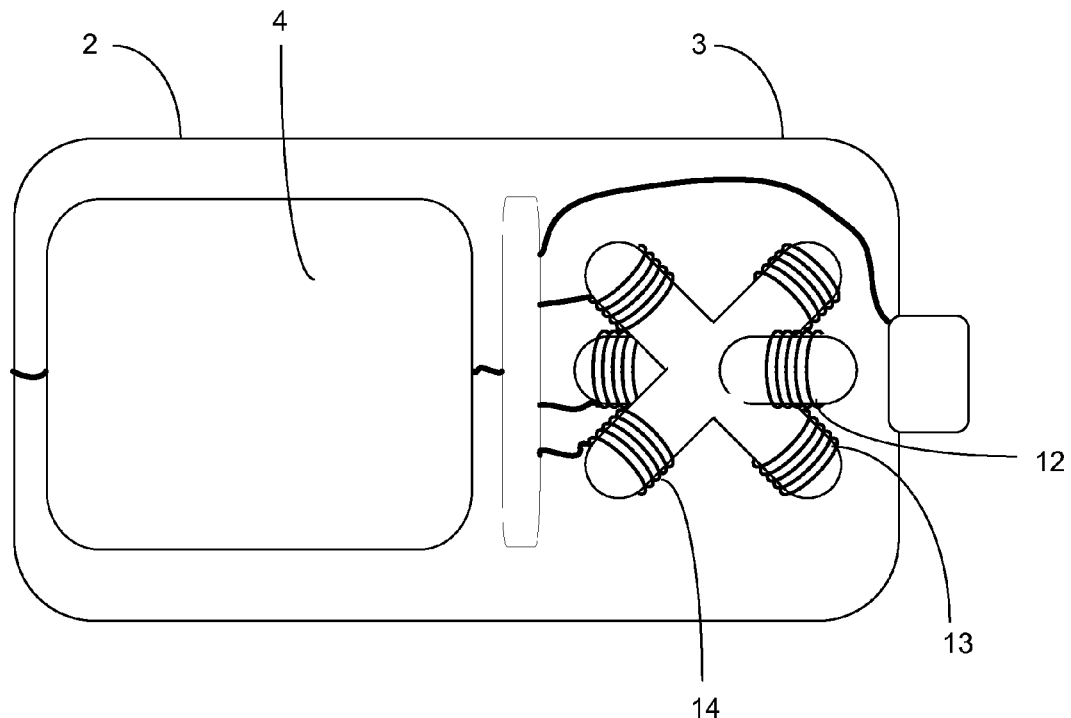
FIG. 3 shows a wirelessly rechargeable battery having a pair of power receiving coils disposed at 45 degrees to the longitudinal axis of the battery and a transverse coil.

FIG. 3 shows an embodiment with three orthogonal coils 12, 13 and 14. This arrangement ensures that there is good coupling between the battery coils and the charging circuit in any orientation but does require an additional coil that may be redundant if the battery will always be in one of the three standard orientations (i.e. up, down or flat in any orientation).

Figure 4:
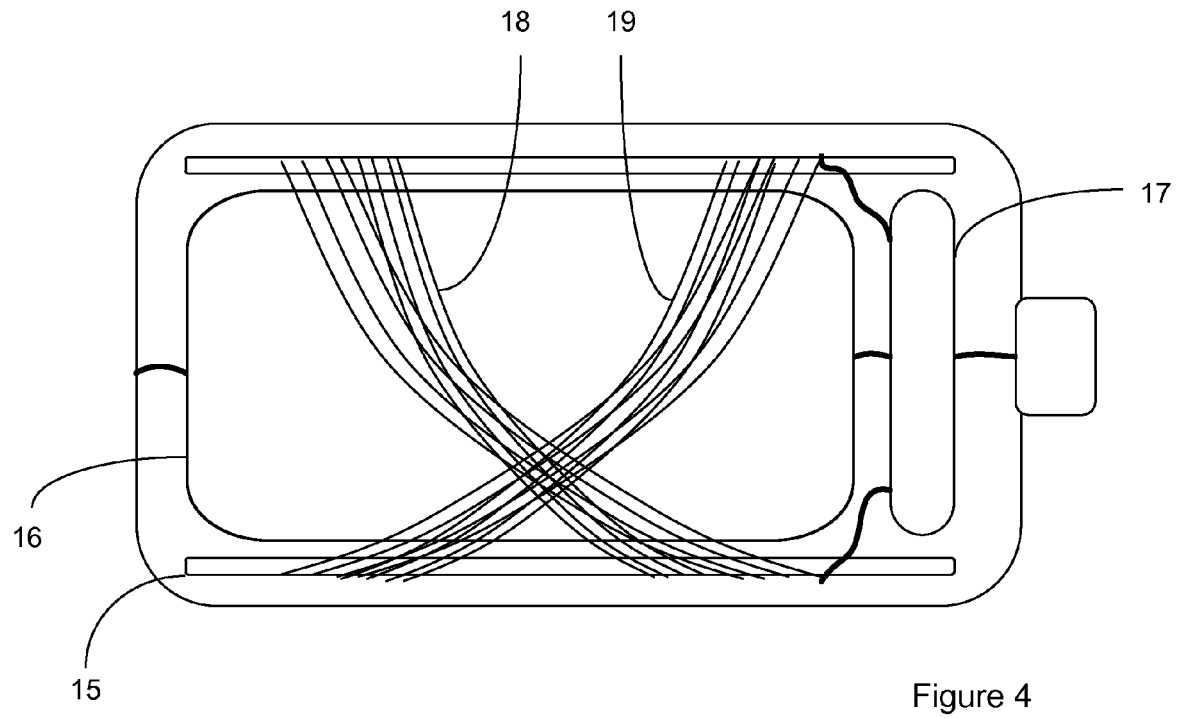
FIG. 4 shows a wirelessly rechargeable battery having a pair of coils wound on a magnetic core housing the electrochemical cell and the charging circuit.

FIG. 4 shows an embodiment in which a tubular ferrite 15 houses both the storage device 16 and the charging circuit 17. Coils 18 and 19 are wound at an angle of between 30 to 60 degrees to the longitudinal axis of the battery to ensure good coupling in the three standard orientations. This design may be suitable where a storage device is of lesser diameter (e.g. AAA) than the casing (e.g. an AA) and there is limited room at each end for coils and the charging circuit.

Figure 5:
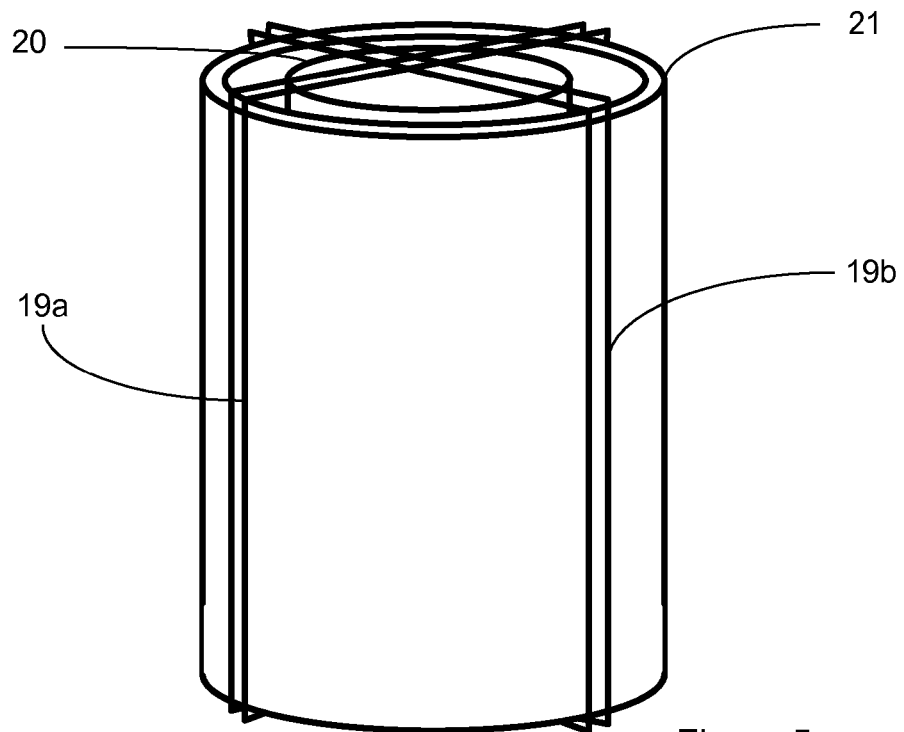
FIG. 5 shows a wirelessly rechargeable battery having a pair of coils wound on a magnetic core housing the electrochemical cell and the charging circuit.

FIG. 5 shows a similar embodiment to FIG. 4 except that the coils 19a and 19b are wound longitudinally around the magnetic core 21 containing storage device 20.

Figure 6:
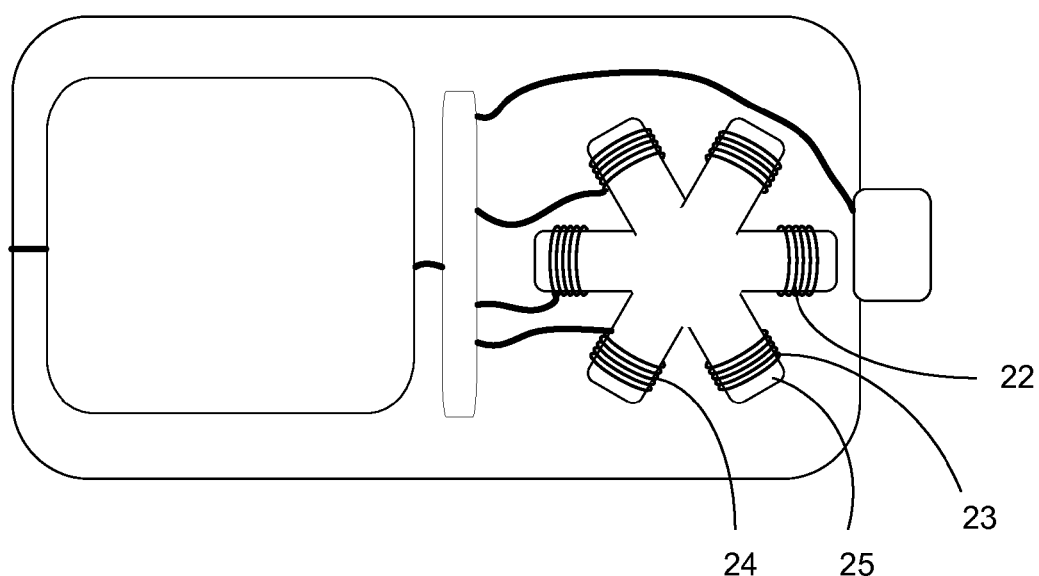
FIG. 6 shows a wirelessly rechargeable battery having power receiving coils disposed at 60 degrees to each other.

FIG. 6 shows another variant in which 3 coils 22, 23 and 24 are wound on magnetic core 25 so as to be oriented to each other at about 60 degrees. This eliminates the dead zone caused when the receiver coil is at 45° to the track and simplifies the electronics design. The pickup coils may be mounted so that none of the coils are in line with the elongate axis of the battery to maximize coupling.

FIG. 7 shows a magnetic core 26 formed in a generally cylindrical form with grooves to accommodate windings 27 and 28 and a cavity 29 to accommodate a charging circuit. This technique may be applied to the embodiments previously described.

The charging circuit in each embodiment may rectify the power received from each coil to avoid any cancellation between coils. The charging circuit may also provide resonant tuning by way of series or parallel resonant tuning techniques. One particularly preferred tuning technique is that disclosed in PCT/NZ2009/000137 as it is easily implemented using a compact integrated circuit design. This circuit may also be used to regulate power supplied to the storage device by detuning the charging circuit. The charging circuit may also pulse its power demand to signal to a power transmitter. The pattern of power demand may encode information as to the charge state of the storage device, charging current, temperature, identifier of the battery etc. depending upon the economics for a given application.

Figure 8:
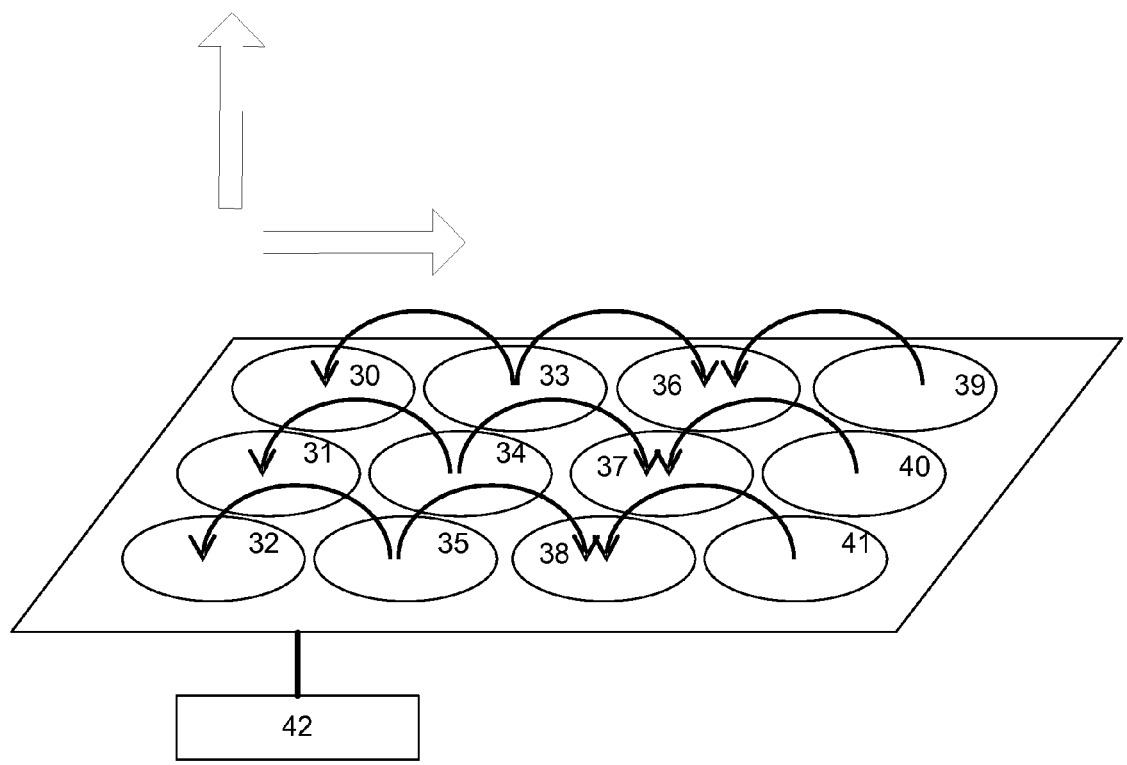
FIG. 8 shows a wireless power transmitter field when the coils are energized in a first pattern.
Figure 9:
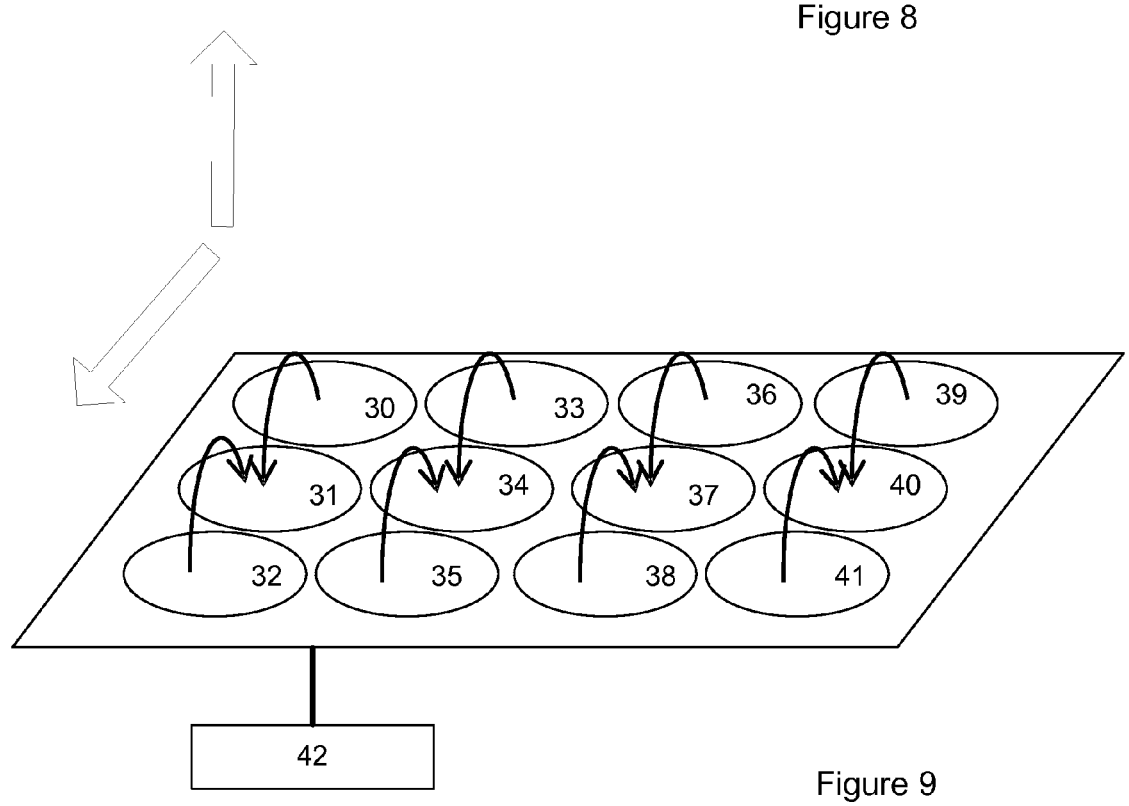
FIG. 9 shows a wireless power transmitter field when the coils are energized in a second pattern.

Referring now to FIG. 8 there is shown a wireless power transmitter in which a driving circuit 42 drives a plurality of coils 30 to 41 so as to produce arcing flux lines suitable for coupling with the receiving coils of wirelessly rechargeable batteries in any orientation. A variety of drive patterns may be employed to optimise coupling. FIG. 8 shows coils 30 to 32 and 36 to 38 driven to produce alternating magnetic fields with a first time varying polarity and coils 33 to 35 and 39 to 41 driven with a second time varying polarity to produce arcing flux lines as shown (showing a snapshot in time as the fields alternate and maintain opposite polarity). This will provide strong coupling when a coil of a battery is oriented along the axes as shown by the arrows. FIG. 9 shows coils 31, 34, 37 and 40 driven to produce a first time varying polarity and the other coils driven to produce a second time varying polarity, opposite to the first, to produce arcing flux lines as shown (at an instant in time). This will provide strong coupling when a coil of a battery is oriented as shown by the arrows.

Figure 10:
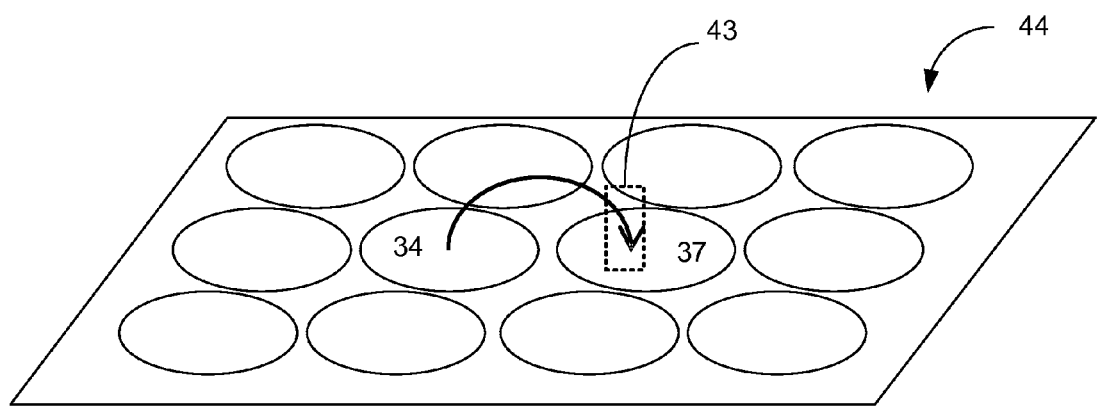
FIG. 10 shows a wireless power transmitter field when the coils are energized in a third pattern.
Figure 11:
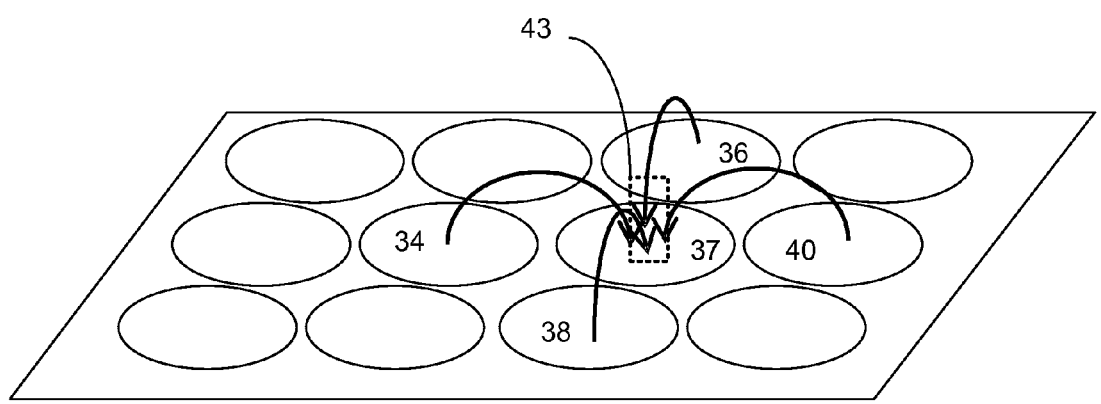
FIG. 11 shows a wireless power transmitter field when the coils are energized in a fourth pattern.

Referring to FIG. 10 the location of a battery 43 may be determined by sensing its affect on fields generated by coils of the wireless power transmitter 44 or by other sensing techniques. Coil pairs 34 and 37 may be energised to produce time varying fields of opposite polarity as shown for a snapshot in time in FIG. 10. This ensures that only the best coupled coils are driven. By driving adjacent coils to produce time varying magnetic fields of opposite polarity the magnetic field may be shaped and the drive load distributed amongst multiple coils. FIG. 11 shows a variant to this approach where coil 37 is driven to produce a time varying magnetic field having a first time varying polarity and a plurality of surrounding coils 34, 36, 38 and 40 are driven to have a time varying magnetic field having a time varying polarity opposite to that produced by coil 37.

For "dumb" batteries the power transmitter may detect the presence of batteries by the load on the power transmitter. In one embodiment the coils may be driven at a relatively low level or intermittently when no batteries are present and when the presence of a battery is detected (by the load drawn) the power level may be increased. When the batteries are charged the low load may again be detected and operation may revert to a relatively low drive level or intermittent drive. The charge circuit may also revert to a relatively low drive level or intermittent drive when disrupting metallic bodies are detected.

For batteries that can communicate (as described above) the power transmitter may receive information as to charge state of the storage device, charging current, temperature, identifier of the battery etc. The power transmitter may then alter the power supplied by coils 30 to 41 to adjust the amount of power supplied and the field pattern to optimise power transfer. Charging can be controlled on an individual coil 30 to 41 to battery relationship or a many to one or many to many relationship.

There are thus provided wirelessly rechargeable batteries that have an efficient form factor and/or allow efficient charging in all standard orientations using two coils. There is also provided a power transmitter for optimizing efficient charging with wirelessly rechargeable batteries.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:
1. A wirelessly rechargeable battery comprising:
   a. an elongate battery casing having a longitudinal axis;
   b. a rechargeable storage device;
   c. a plurality of power receiving coils disposed at an angle of between 30 to 60 degrees to the longitudinal axis; and
   d. a charging circuit for controlling the supply of power from the coils to the storage device.
2. A battery as claimed in claim 1 wherein the receiving coils are disposed at an angle of about 45 degrees to the longitudinal axis.
3. A battery as claimed in claim 1 having two coils.
4. A battery as claimed in claim 3 wherein the coils are substantially orthogonal.
5. A battery as claimed in claim 1 having three coils.
6. A battery as claimed in claim 5 wherein the coils are oriented at about 60 degrees to each other.
7. A battery as claimed in claim 1 wherein the charging circuit provides resonant circuit tuning.
8. A battery as claimed in claim 7 wherein the charging circuit provides resonant circuit tuning by way of series tuning compensation.
9. A battery as claimed in claim 7 wherein the charging circuit provides resonant circuit tuning by way of a semiconductor operating in linear mode.
10. A battery as claimed in claim 1 wherein the coils are wound about a magnetic core.
11. A battery as claimed in claim 10 wherein the magnetic core has a cavity to at least partially house the charging circuit.
12. A battery as claimed in claim 11 wherein the charging circuit is entirely housed within the cavity in the core.
13. A wirelessly rechargeable battery comprising:
   a. a battery casing;
   b. a rechargeable storage device;
   c. one or more power receiving coils mounted on a ferrite core; and
   d. a charging circuit for controlling the supply of power from the coils to the storage device, wherein at least one of the charging circuit and the storage device is at least partially housed within the ferrite core.

* * * * *